US009522338B1

(12) United States Patent
Park (10) Patent No.: US 9,522,338 B1
(45) Date of Patent: Dec. 20, 2016

(54) ASSEMBLY TYPE BLOCK MODULE FOR WATER PLAYING

(71) Applicant: Jeong Kyun Park, Seoul (KR)

(72) Inventor: Jeong Kyun Park, Seoul (KR)

(73) Assignees: DPI CO., LTD., Seoul (KR); DREAMPARK INTERNATIONAL, Suwanee, GA (US)

( * ) Notice: Subject to any disclaimer, the term of this patent is extended or adjusted under 35 U.S.C. 154(b) by 0 days.

(21) Appl. No.: 14/820,899

(22) Filed: Aug. 7, 2015

(51) Int. Cl.
*A63G 31/00* (2006.01)
*F16L 21/08* (2006.01)
*F16L 11/20* (2006.01)

(52) U.S. Cl.
CPC ............. *A63G 31/007* (2013.01); *F16L 21/08* (2013.01)

(58) Field of Classification Search
CPC ...... A63G 31/00; A63G 31/007; A63H 23/10; B29C 47/023; F16L 11/20; F16L 35/00
USPC ... 472/13, 117, 128; 446/153; 138/109, 113, 138/114
See application file for complete search history.

(56) References Cited

U.S. PATENT DOCUMENTS

| | | | | |
|---|---|---|---|---|
| 4,157,194 A * | 6/1979 | Takahashi | ........... | B29C 47/0023 138/109 |
| 4,786,088 A * | 11/1988 | Ziu | .......... | F16L 7/00 138/113 |
| 5,624,140 A * | 4/1997 | Allen | ...... | B29C 65/20 138/114 |
| 5,741,189 A * | 4/1998 | Briggs | ..... | A63B 9/00 472/128 |
| 6,050,872 A * | 4/2000 | Cahill | ...... | A63H 33/3061 239/279 |
| 6,786,830 B2 * | 9/2004 | Briggs | ..... | A63B 9/00 472/117 |

* cited by examiner

*Primary Examiner* — Kien Nguyen
(74) *Attorney, Agent, or Firm* — Panitch Schwarze Belisario & Nadel LLP (57) ABSTRACT

Provided is an assembly type block module for water playing, including: a plurality of unit assembly blocks including: a body; an inner passage formed in the interior of the body such that fluid flows through the inner passage; and coupling parts detachably coupled to corresponding coupling parts of other unit assembly blocks such that the inner passages thereof are communicated with each other at any one of opposite ends of the body, wherein the unit assembly blocks have different shapes of the bodies and different forms of inner passages, fluid is supplied from an external fluid supply source while the unit assembly blocks are assembled, and the supplied fluid is discharged to the outside through the inner passage of the unit assembly block located at the extreme end after flowing through the inner passages of the unit assembly blocks.

12 Claims, 13 Drawing Sheets

ASSEMBLY TYPE BLOCK MODULE FOR WATER PLAYING

BACKGROUND OF THE INVENTION

Field of the Invention

The present invention relates to an assembly type block module for water playing, and more particularly, to an assembly type block module for water playing in which inner passages are formed and a plurality of unit assembly blocks are coupled to each other in various shapes by the user such that fluid supplied from a fluid supply source can flow.

Description of the Related Art

In general, water playing devices are devices, which allow the user to directly ride or enjoy plays using a fluid ejected therefrom, and are mainly installed in a large-scale amusement park or the like.

Furthermore, not only facilities simply for water playing but also facilities such as fountains that can be visually enjoyed are mainly installed in public places or resorts.

However, because the water playing devices are continuously fixed once installed or have one shape so as not to be deformed, when used consistently, the user may feel boredom.

In addition, it is difficult to install large-scale facilities if a building site is not sufficiently secured.

Accordingly, it is necessary to develop water playing facilities that can be installed in a narrow site and can change the shapes or constructions thereof in correspondence to the tastes of the user.

SUMMARY OF THE INVENTION

The present invention has been made in an effort to solve the above-mentioned problems and provides an assembly type block module for water playing by which various forms of water playing can be enjoyed by assembling a plurality of unit assembly blocks such that the assembly type block module has a shape selectively desired by a user and allowing fluid supplied from a separate fluid supply source to flow along inner passages formed in the unit assembly blocks to be ejected.

The technical problems of the present invention are not limited to the above-mentioned ones, and other unmentioned technical problems will be understood by those skilled in the art to which the present invention pertains.

In accordance with an aspect of the present invention, there is provided an assembly type block module for water playing, including: a plurality of unit assembly blocks including: a body; an inner passage formed in the interior of the body such that fluid flows through the inner passage; and coupling parts detachably coupled to corresponding coupling parts of other unit assembly blocks such that the inner passages thereof are communicated with each other at any one of opposite ends of the body, wherein the unit assembly blocks have different shapes of the bodies and different forms of inner passages, fluid is supplied from an external fluid supply source while the unit assembly blocks are assembled, and the supplied fluid is discharged to the outside through the inner passage of the unit assembly block located at the extreme end after flowing through the inner passages of the unit assembly blocks.

The assembly type block module may further include: a water supply block provided on an installation surface and coupled to the unit assembly block, for delivering the fluid supplied from the fluid supply source to the inner passage formed in the unit assembly block.

The assembly type block module may further include: an ejection block coupled to at least one of the plurality of unit assembly blocks, for discharging the fluid flowing through the inner passages to the outside in a specific pattern.

The coupling part may have an inlet through which the fluid is introduced at one side of the body and an outlet through which the fluid is discharged at another side of the body along a lengthwise direction of the inner passage, and the plurality of unit assembly blocks are configured such that the outlets and the inlets formed therein make contact with each other and the inner passages thereof are communicated each other when the unit assembly blocks are coupled to each other.

The coupling part may include: a first coupling boss protruding from a side distance from the outlet by a predetermined length; and a first coupling recess recessed such that the first coupling boss having the inlet is inserted into the first coupling recess.

The first coupling boss may have at least one first stopping step protruding in a direction crossing the protrusion direction of the first coupling boss at a lengthwise end thereof, a first through-hole recessed such that the first stopping step passes through the first through-hole is formed in correspondence to the first coupling boss along a circumference of the first coupling recess, and it is selectively determined by the mutual rotation angle of the plurality of unit assembly blocks whether the plurality of unit assembly blocks are coupled to each other.

The unit assembly block may be formed such that at least some of the plurality of inner passages are branched to have a plurality of outlets.

The assembly type block module may further include: a separate sealing member provided on the coupling part, for preventing the fluid from being leaked to the outside through the inner passages formed in the plurality of unit assembly blocks when the unit assembly blocks are coupled to each other.

The assembly type block module may further include: at least one blocking block coupled to the unit assembly block, for blocking the fluid such that the fluid is not discharged to the outside through the inner passages.

At least a portion of the unit assembly block may be formed of a transparent material.

Some of the plurality of unit assembly blocks may have different shapes.

Some of the unit assembly blocks may be curved and the inner passages thereof are curved correspondingly.

The unit assembly block may be formed of a soft material and the shape of the unit assembly block is selectively deformed by the user.

The assembly type block module for water playing according to the present invention has the following advantages.

First, because a plurality of unit assembly blocks are assembled by the user to have various shapes and inner passages of the unit assembly blocks are communicated with each other such that fluid may flow along the unit assembly blocks to be discharged to the outside, the user can build a desired shape to enjoy water playing.

Second, because the present invention includes a separate ejection block coupled to at least one of the plurality of unit assembly blocks such that the fluid has various forms, the user can select the form of the ejected fluid.

The advantages of the present invention are not limited to the above-mentioned ones, and other unmentioned advantages will be clearly understood by these skilled in the art from the description of the claims.

BRIEF DESCRIPTION OF THE DRAWINGS

The above and other aspects, features and advantages of certain exemplary embodiments of the present invention will be more apparent from the following description taken in conjunction with the accompanying drawings, in which.

DETAILED DESCRIPTION OF EXEMPLARY EMBODIMENTS

Hereinafter, an exemplary embodiment of the present invention will be described in detail with reference to the accompanying drawings. Meanwhile, in the description of the present invention, known functions or configurations will not be described in order that the essence of the present invention can be clearly described.

In addition, in the description of the present invention, terms including the front side/rear sides and the upper/lower sides, which indicate directions, are provided to help clearly understand the present invention, and indicate relative directions and thus do not limit the scope of the present invention.

First, a configuration of an assembly type block module for water playing according to the present invention will be schematically described below with reference to the accompanying drawings.

The assembly type block module for water playing according to the present invention is a device that is assembled by the user to have a specific shape with a plurality of blocks each having an inner passage therein in order to help enjoy water playing by ejecting fluid supplied from a separate fluid supply source through inner passages 130 to the outside.

Figure 1:
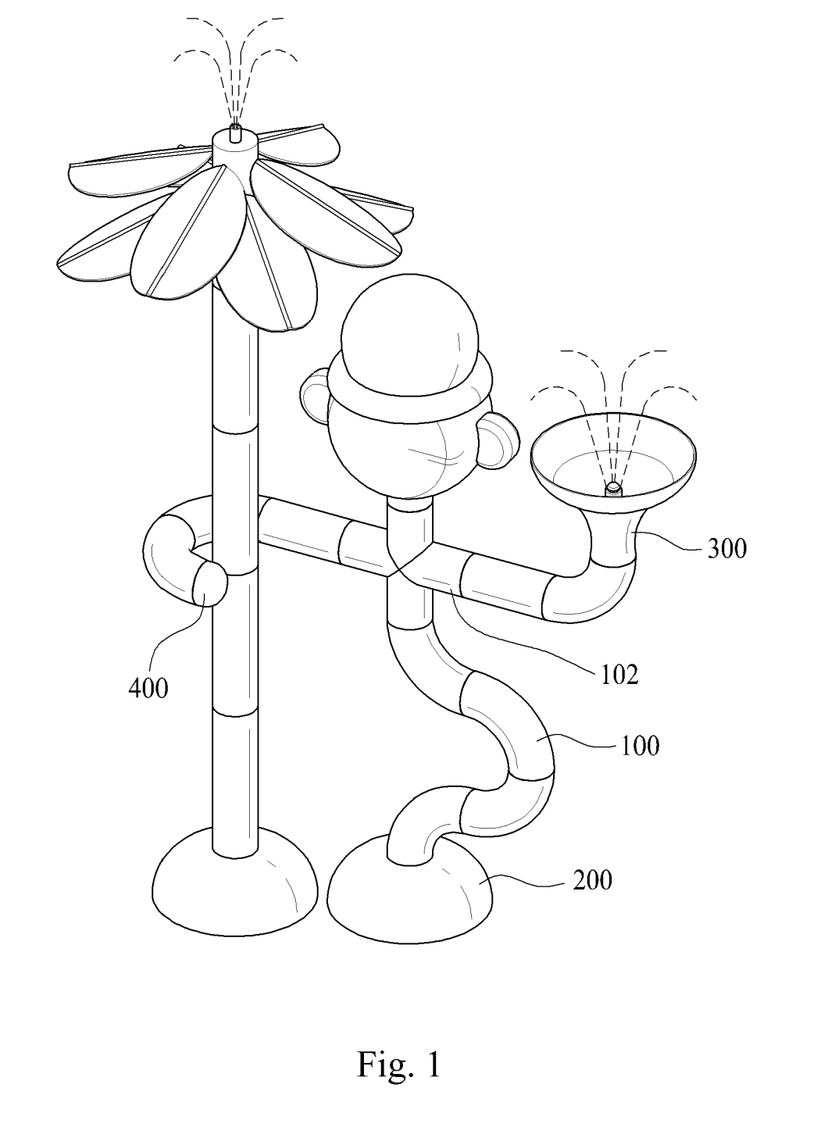
FIG. 1 is a view schematically illustrating a configuration of an assembly type block module for water playing according to an embodiment of the present invention.

The assembly type block module for water playing according to the present invention largely includes: a plurality of unit assembly modules 100; a water supply block 200; and an ejection block 300.

The number of the unit assembly blocks 100 is plural, and an inner passage 130 through which fluid flows is formed in each of the unit assembly blocks 100. The plurality of unit assembly blocks 100 are coupled to be attachable to or detachable from each other by the user.

Then, the unit assembly blocks 100 are coupled to each other such that the inner passages 130 formed therein are communicated with each other when they are coupled.

Figure 2:
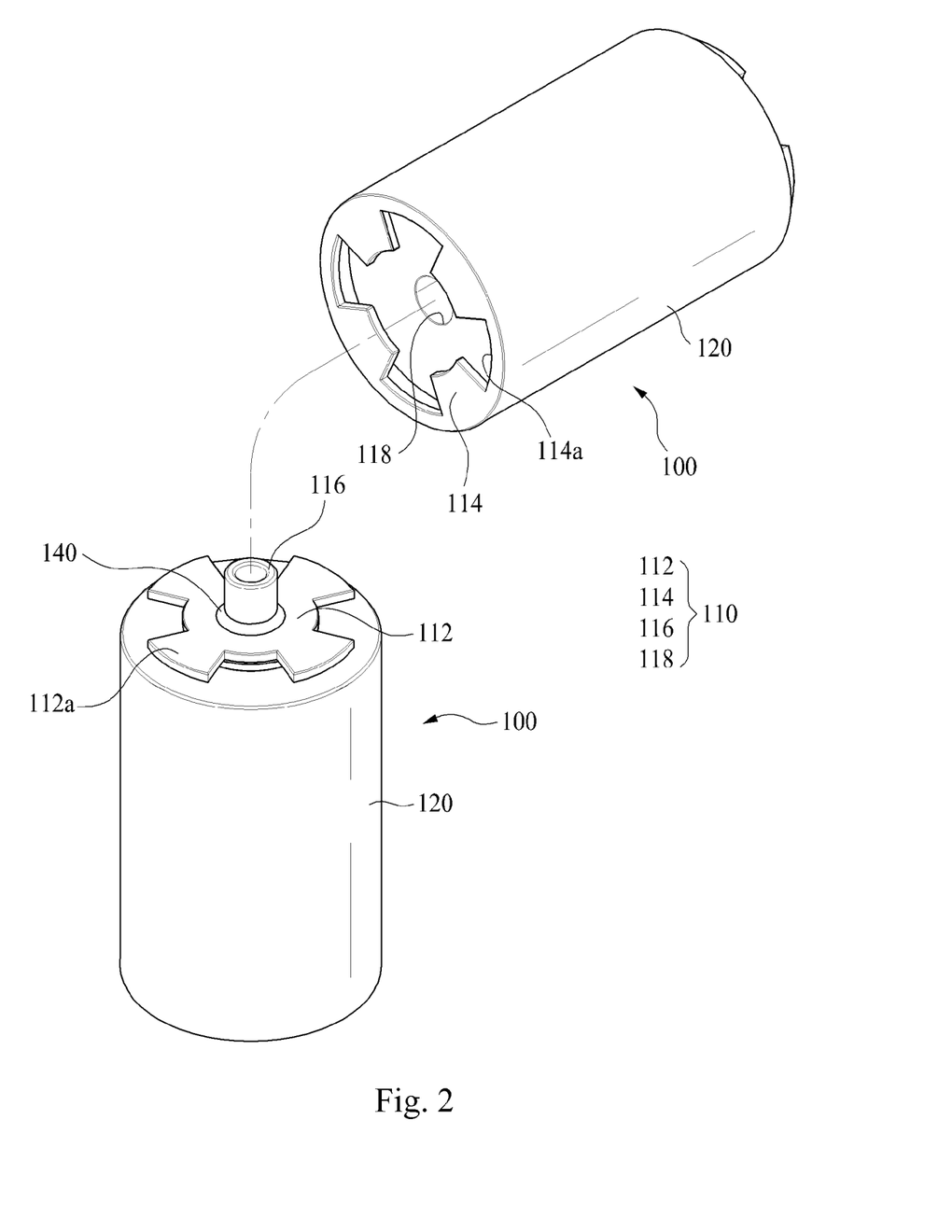
FIG. 2 is a view illustrating a coupling part of a unit assembly block of the assembly type block module for water playing of FIG. 1.

In detail, the unit assembly block 100 includes a body 120, an inner passage 130, and a coupling part 110, and the inner passages of the plurality of unit assembly blocks 100 are communicated with each other by the coupling parts 110.

The body 120 has a block shape that forms an outer shape of the body 120, and two bodies 120 are coupled to each other by the coupling parts 110. The inner passages 130 are formed in the interiors of the bodies 120 such that fluid may flow through the passages 130.

In detail, the coupling part 110 includes an inlet 118 through which fluid is introduced from the body 120 along a lengthwise direction of the inner passage 130 at one side thereof and an outlet 116 through which the fluid is discharged at another side thereof, and when two coupling parts 110 are coupled to each other, their outlets 116 make contact with each other such that their inner passages 130 are communicated with each other.

Figure 3:
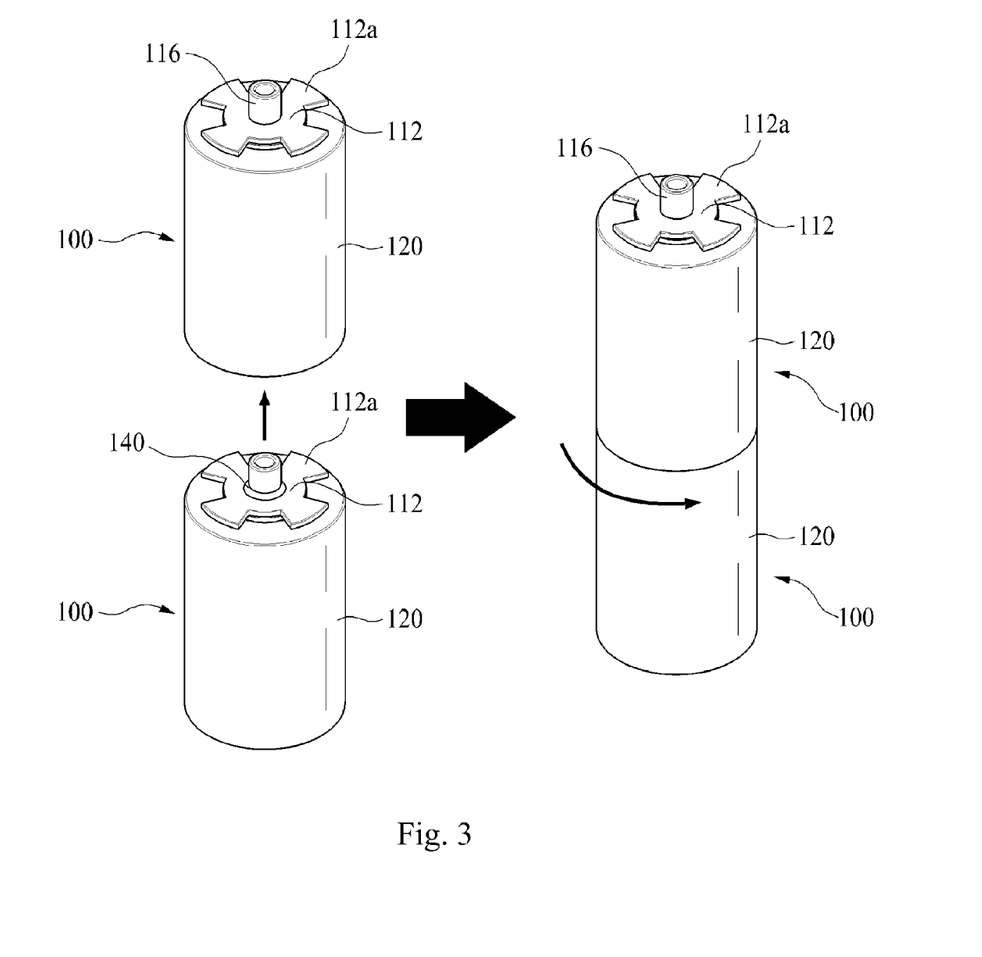
FIG. 3 is a view illustrating a state in which a pair of unit assembly blocks is coupled to each other in the assembly type block module for water playing of FIG. 1.

That is, when the unit assembly blocks 100 are coupled to each other, their outlets 116 make contact with the inlets 118, and thus the inner passages 130 formed in the plurality of unit assembly blocks 100 are communicated with each other such that the fluid supplied from a fluid supply source may stably flow.

Figure 4:
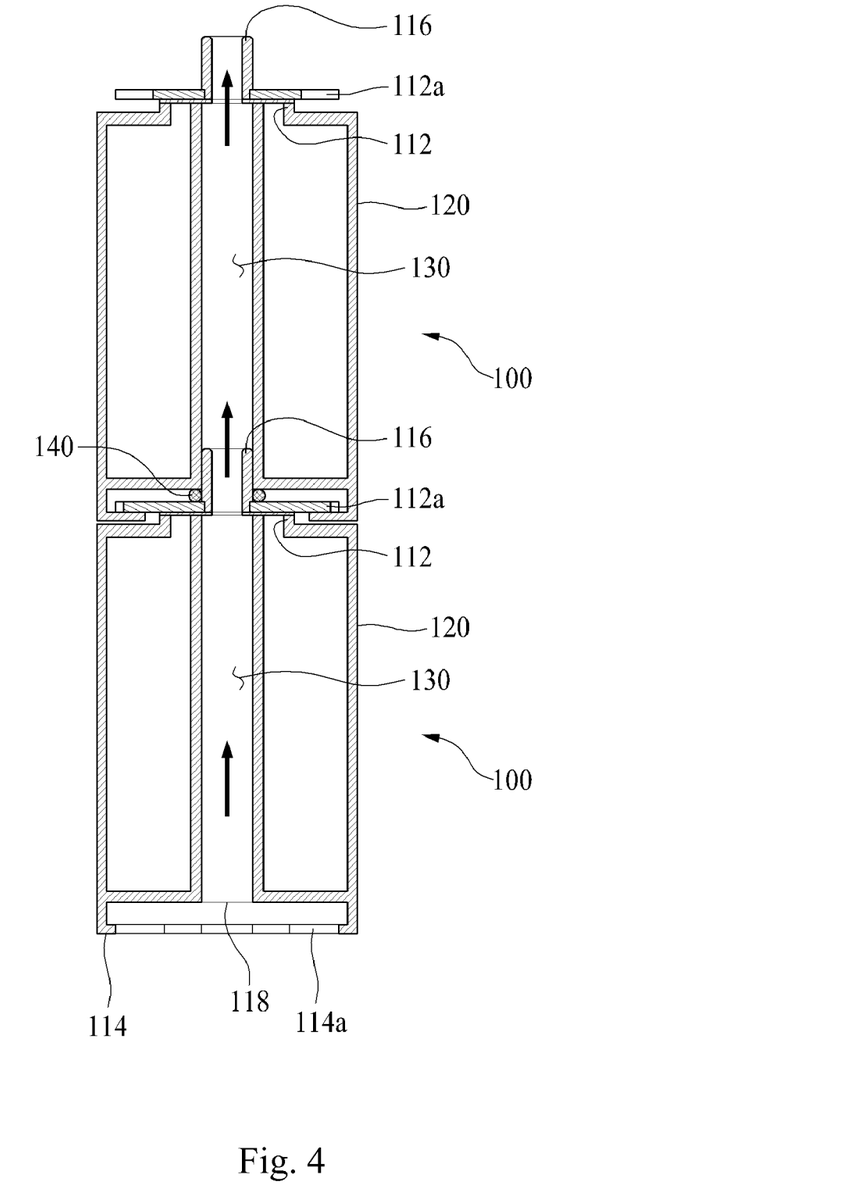
FIG. 4 is a view illustrating an inner profile formed by coupling the unit assembly blocks of FIG. 3.

Because the inner passages 130 formed in the unit assembly blocks 100 are connected to each other, the fluid supplied from the fluid supply source can stably and continuously flows via the plurality of unit assembly blocks 100 through the inner passages 130 and then is discharged to the outside.

Here, the fluid supplied from the fluid supply source through the inner passages 130 may be water, and also may be a fluid other than water.

In this way, according to the present invention, a plurality of different unit assembly blocks 100 having different shapes of the bodies 120 and different forms of inner passages 130 may be provided, and fluid is supplied from the fluid supply source while the unit assembly blocks 100 are assembled and the supplied fluid is discharged to the outside through the outlet 116 of the unit assembly block 100 located at the extreme end after the supplied fluid flows along the inner passages 130 of the unit assembly blocks 100.

Meanwhile, in the embodiment of the present invention, the coupling parts 110 mutually couple the plurality of unit assembly blocks 100, and as illustrated, each of the coupling parts 110 includes a first coupling boss 112 protruding by a predetermined length from a side distant from the outlet 116 and a first coupling recess 114 recessed at one side close to the inlet 118 such that the first coupling boss 112 is inserted into the first coupling recess 114.

In detail, the first coupling boss 112 protrudes to one side along a lengthwise direction of the inner passage 130 and is small than a circumference of the unit assembly block 100.

Separately from the first coupling boss 112, the first coupling recess 114 is recessed from the unit assembly block 100, and is formed in correspondence to the shape of the first coupling boss 112 such that the first coupling boss 112 may be inserted into the corresponding first coupling recess 114.

The inner passage 130 formed in the unit assembly block 100 is configured such that opposite ends of the inner passage 130 are located on the first coupling boss 112 and the first coupling recess 114 such that the inner passages 130 of the plurality of unit assembly blocks 100 may be communicated with each other when their first coupling bosses 112 and their first coupling recesses 114 are coupled to each other.

In this way, the coupling part 110 according to the present invention includes a first coupling boss 112 and a first coupling recess 114, and a plurality of unit assembly blocks 100 are coupled to each other by coupling their first coupling bosses 112 and the corresponding first coupling recesses 114.

In the embodiment of the present invention, the unit assembly block 100 has a cylindrical shape and has a first coupling boss 112 at one lengthwise side thereof and a first coupling recess 114 at an opposite side thereof, and the unit assembly blocks 100 are coupled to each other along a lengthwise direction thereof.

Figure 13:
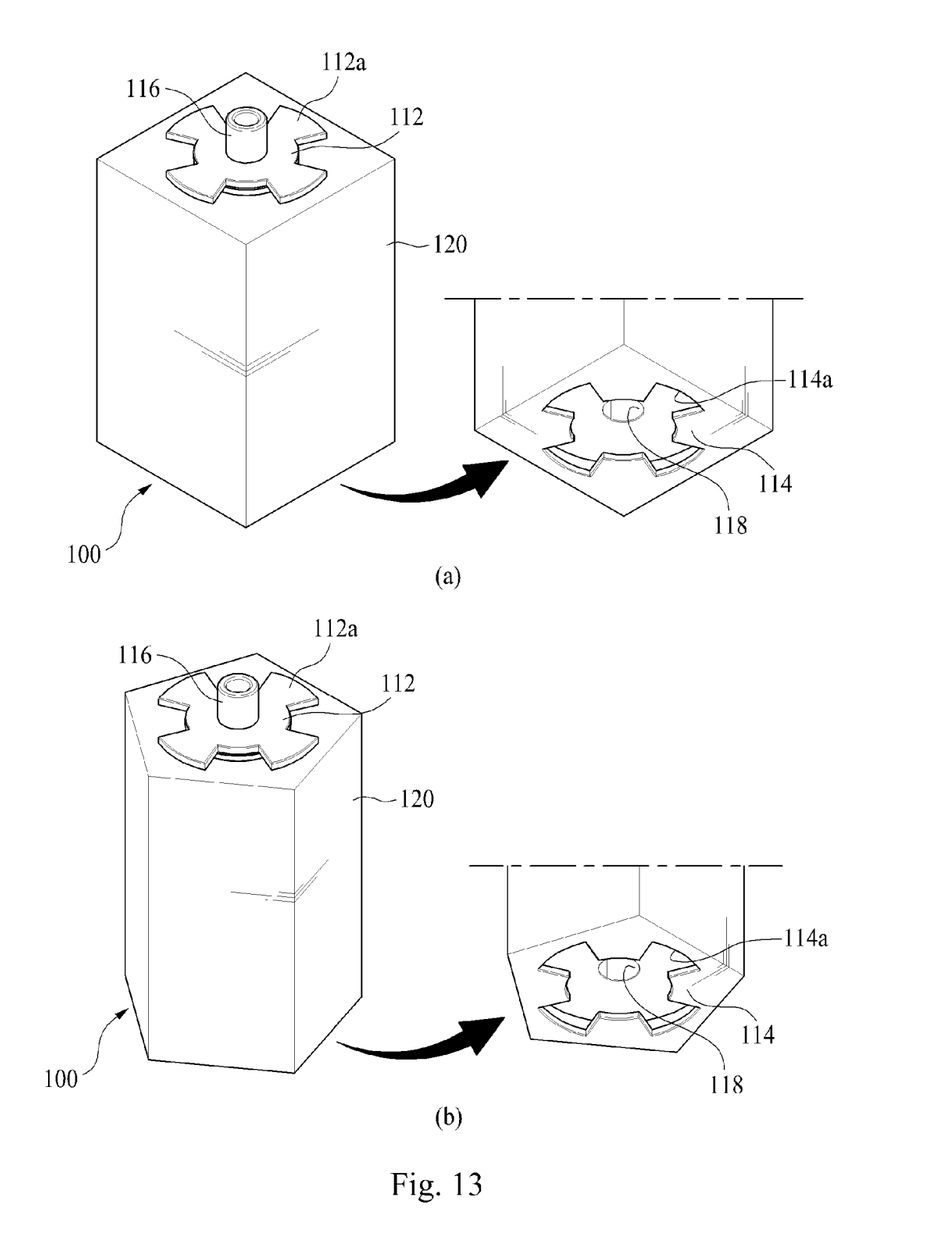
FIG. 13 is a view illustrating a modification of the assembly block in the assembly type block module for water playing of FIG. 1.

However, as illustrated in FIG. 13, differently from the structure, the unit assembly block 100 may have various shapes such as a polygonal column instead of a cylindrical shape, and the user may select and use unit assembly blocks 100 suitable for building a structure through the unit assembly blocks 100.

Meanwhile, in the embodiment of the present invention, the first coupling boss 112 as at least one first stopping step 112*a* protruding in a direction crossing the protrusion direction of an end thereof along the protruding length direction.

In detail, a plurality of first stopping steps 112*a* protrude while crossing the protrusion direction of the first coupling boss 112 to be selectively fixed to the first coupling recesses 114.

The first coupling recess 114 has a first through-hole 114*a* recessed such that a first coupling step 112*a* passes through the first through-hole 114*a* in correspondence to a first coupling boss 112.

Here, the first through-hole 114*a* is provided at an end of the unit assembly block 100 on the first coupling recess 114 recessed at one side of the unit assembly block 100, and is configured such that the first stopping step 112*a* may be accommodated in the first through-hole 114*a*.

That is, a plurality of first stopping steps 112*a* protrude in a direction crossing the protrusion direction of the protruding first coupling boss 112, and pass through the first through-hole 114 and are located in the first coupling recesses 114 when being coupling to the first coupling recesses 114.

In this way, while the first stopping step 112*a* passes through the first through-hole 114*a*, a pair of unit assembly blocks 100 may selectively maintain a coupling state thereof through mutual adjustment of rotation angles of the unit assembly blocks 100.

As illustrated, a plurality of first stopping steps 112*a* are spaced apart from each other in a transverse direction thereof on the first coupling bosses 112, and may pass through the corresponding through-holes 114*a* in correspondence to the shape and disposition of the first stopping steps 112*a*.

In this way, because the first through-holes 114*a* are formed in the first coupling recesses 114, the unit assembly blocks 100 may maintain a mutual coupling state according to a mutual rotation angle of the unit assembly blocks 100 while the first coupling bosses 112 are located in the first coupling recesses 114.

Meanwhile, each of the unit assembly blocks 100 according to the present invention may further include a separate sealing member 140 provided on the coupling part 110, for preventing the fluid flowing through the inner passage 130 from being leaked to the outside when the unit assembly blocks 100 are coupled to each other.

In detail, the sealing member 140 is formed in at least one of the first coupling boss 112 and the first coupling recess 114 of the unit assembly block 100 to prevent fluid from being leaked to the outside when the outlet 116 and the inlet 118 are communicated with each other.

In the embodiment of the present invention, the sealing member 140 may be formed of a flexible material such as rubber or silicon, and as illustrated, is provided on the first coupling boss 112 to prevent leakage of fluid flowing along the inner passages 130 when the first coupling boss 112 and the corresponding first coupling recess 114 are coupled to each other.

Then, as illustrated, the outlet 116 is formed to further protrude from the first coupling boss 112, and may be formed to be smaller than the diameter of the inlet 118.

When a pair of unit assembly blocks 100 are coupled to each other, the outlet 116 is configured to be inserted into the inlet 118 through the first coupling recess 114. Here, the sealing member 140 is disposed to surround a circumference of the protruding outlet 116, and is inserted into the inlet 118 when the outlet 116 is inserted into the outlet 116 to prevent leakage of fluid.

Of course, although not illustrated, differently from the above structure, the sealing member 140 may be provided on the inlet 118 to prevent fluid from being leaked on a border of the inlet 118 and the outlet 116.

Meanwhile, in the embodiment of the present invention, an end of the outlet 116 may additionally extend from the corresponding first coupling boss 112 protruding along a lengthwise direction of the unit assembly block 100 and may be inserted into the inlet 118.

In this way, the assembly type block module for water playing according to the present invention is configured such that a plurality of unit assembly blocks 100 are coupled to each other by the user such that the inner passages 130 thereof are communicated with each other, and is built to have various lengths and shapes according to selection of the user.

As described above, because the first coupling bosses 112 and the first coupling recesses 114 formed in the unit assembly blocks 100 are selectively attached to or detached from each other, the unit assembly blocks 100 may stably maintain a mutual coupling state.

Meanwhile, at least some of the unit assembly blocks 100 according to the present invention may have different shapes, and may be configured to be assembled in various forms through selection of the user.

In detail, as illustrated in FIG. 1, some of the unit assembly blocks 100 may be formed in a curved form, and may be configured such that the inner passages 130 thereof are curved correspondingly.

Accordingly, when the user combines and assembles the plurality of unit assembly blocks 100, they may be built in a desired form while the paths of the inner passages 130 are made various.

In this way, because some of the plurality of unit assembly blocks 100 are curved, the inlets 118 and the outlets 116 formed in the unit assembly blocks 100 may be disposed at various angles while not facing each other.

Accordingly, the user may assemble the unit assembly blocks 100 in various forms to enjoy water playing.

In addition, the unit assembly blocks 100 may be formed of a flexible material such that the shapes of the unit assembly blocks 100 may be selectively deformed by an external force of the user.

Figure 5:
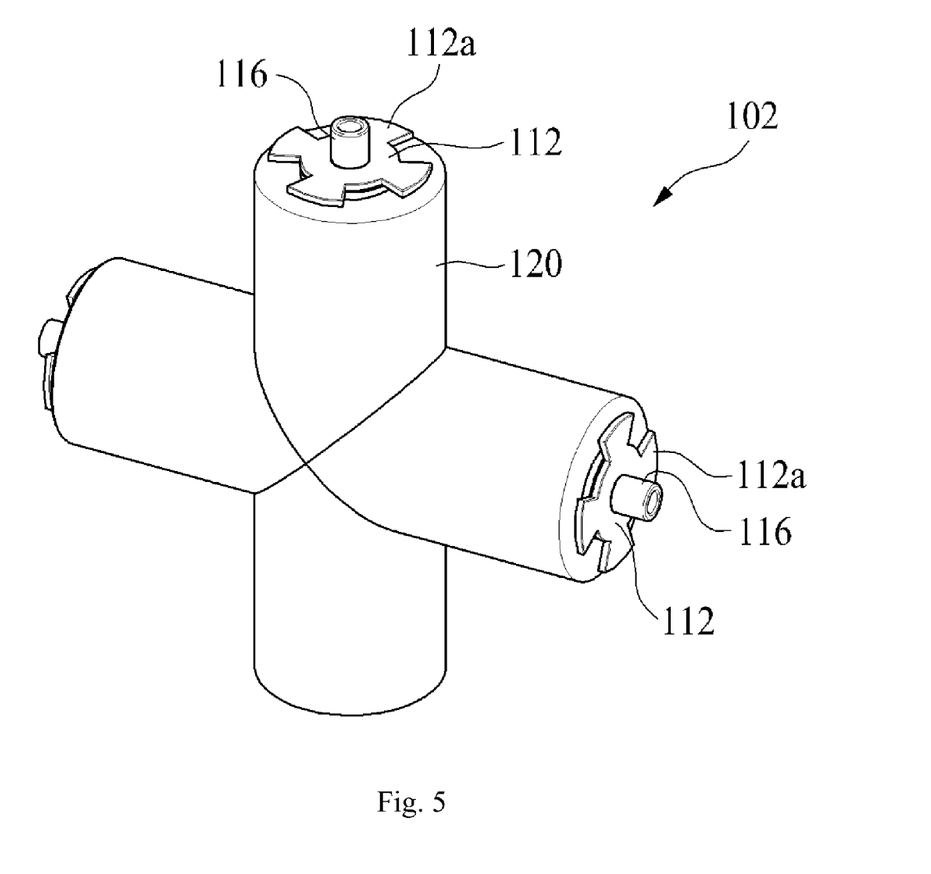
FIG. 5 is a view illustrating a configuration of a modification of the unit assembly block formed by branching the inner passage such that the assembly type block module for water playing of FIG. 1 has a plurality of outlets.
Figure 6:
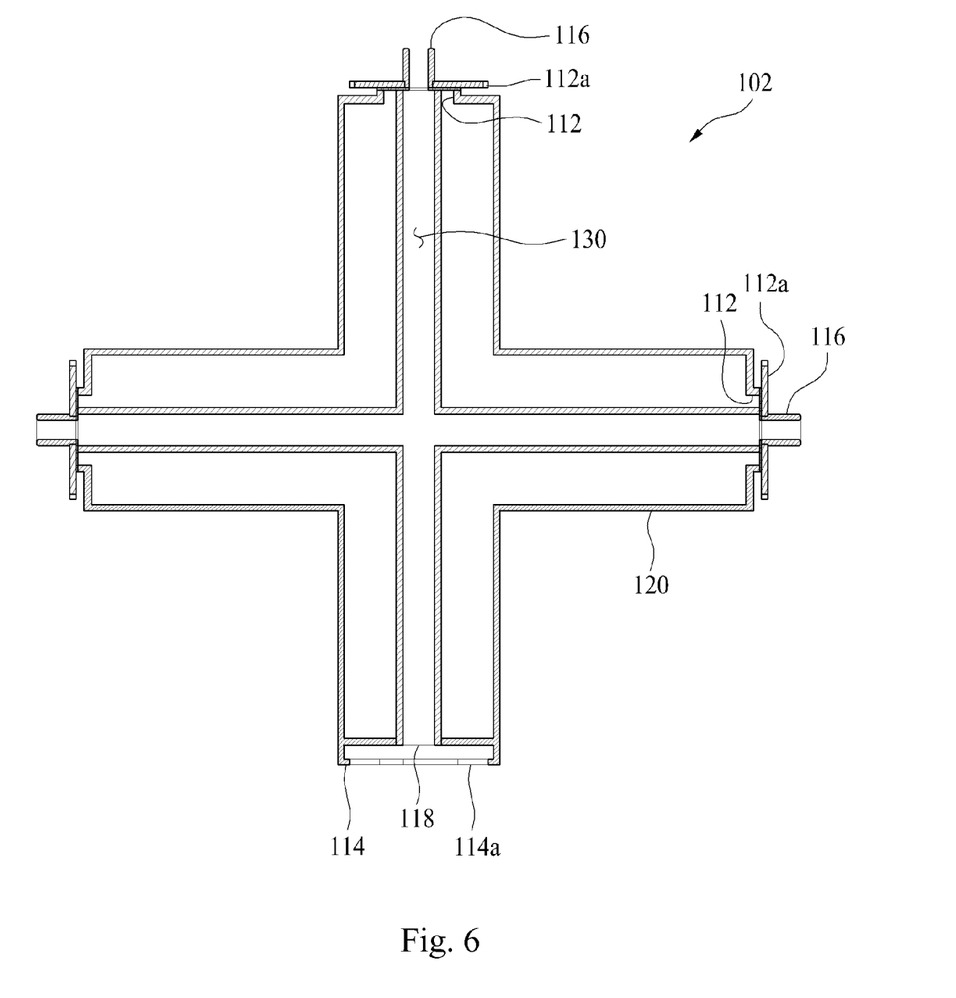
FIG. 6 is a sectional view illustrating an inner configuration of the unit assembly block of FIG. 5.

Meanwhile, at least some of the plurality of assembly blocks 100 according to the present invention may be configured such that the inner passages 130 thereof are branched to have the plurality of corresponding outlets 116.

In detail, although being similar to those descriptions made above, as illustrated in FIGS. 5 and 6, the unit assembly block 102 may have a plurality of outlets 116 and a plurality of first coupling bosses 112 may protrude correspondingly.

The unit assembly blocks 100, ejection blocks 300, or blocking blocks 400 corresponding to the number of the first coupling bosses 112 are coupled to the unit assembly blocks 102 formed in this way. Here, the inner passages 130 formed in the unit assembly blocks 102 are branched such that fluid may be branched through the outlets 116 to be ejected.

That is, when a plurality of outlets 116, instead of one outlet 116, are formed in the unit assembly block 102, unit assembly blocks 100 or ejection blocks 300 are coupled to the plurality of outlets 116, and the inner passages 130 thereof are communicated with each other such that fluid may be stably branched.

Here, as described above, the unit assembly block 102 has a plurality of first coupling bosses 112 and a plurality of first coupling recesses 114, and inner passages 130 thereof are branched such that fluid may flow through the inner passages 130.

In this way, because at least some inner passages 130 of the unit assembly blocks 100 may be branched, the unit assembly blocks 100 may have various shapes when being assembled.

Figure 7:
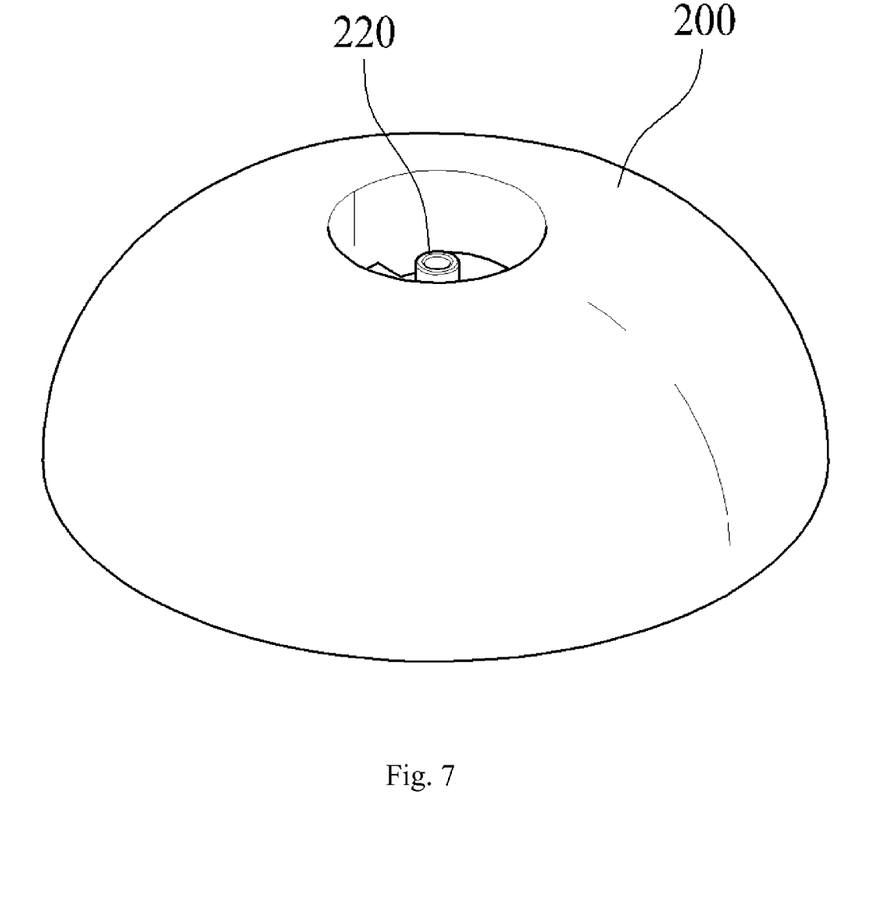
FIG. 7 is a view illustrating a configuration of a water supply block in the assembly type block module for water playing of FIG. 1.
Figure 8:
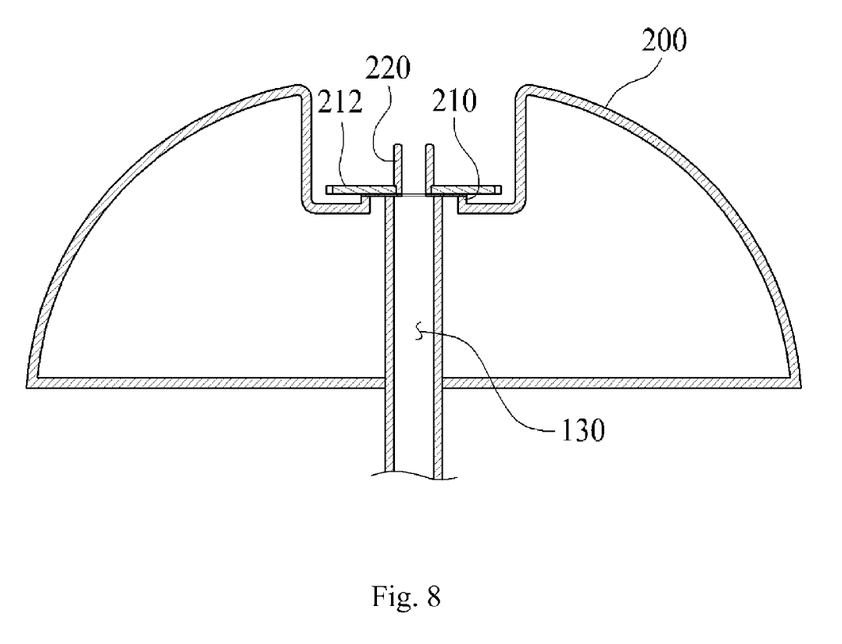
FIG. 8 is a sectional view illustrating an inner configuration of the water supply block of FIG. 7.

Meanwhile, the water supply block 200 according to the present invention is provided on an installation surface and is coupled to the unit assembly block 100, and delivers the fluid supplied from the fluid supply source to the inner passage 130 formed in the unit assembly block 100.

In detail, the water supply block 200 is configured such that fluid may be supplied through the inner passage 130 between the fluid supply source and the unit assembly block 100, and in the embodiment of the present invention, the fluid supplied from the fluid supply source is supplied to the unit assembly block 100 on the installation surface.

A second coupling boss 210 may be formed at one side of the water supply block 200 to be coupled to the unit assembly block 100.

As illustrated in FIGS. 7 and 8, the water supply block 200 has an inner passage 130 through which the fluid supplied from the fluid supply source flows, and a supply opening 220 is formed at one side of the inner passage 130. The supply opening 220 is connected to the inlet 118 formed in the unit assembly block 100 such that fluid is supplied to the unit assembly block 100.

Here, a second coupling boss 210 is formed such that the water supply block 200 is coupled to at least one of the plurality of unit assembly blocks 100 by the user.

Because the second coupling boss 210 is coupled to the first coupling recess 114 formed in the unit assembly block 100, the water supply block 200 and the unit assembly block 100 may be stably coupled to each other.

Then, it is preferable that, as illustrated, the second boss 210 formed in the water supply block 200 is formed in the same manner as the first coupling boss 112 formed in the unit assembly block 100, but the second boss 210 may be formed in a different shape.

In the embodiment of the present invention, a second stopping step 212 is formed such that the second coupling boss 210 may be coupled to the unit assembly block 100.

That is, the second coupling boss 210 formed in the water supply block 200 may be formed in various shapes, and may be stably coupled to any one of the plurality of unit assembly blocks 100 by the user such that the fluid supplied from the fluid supply source may be delivered into the inner passage 130 formed in the unit assembly block 100.

Figure 9:
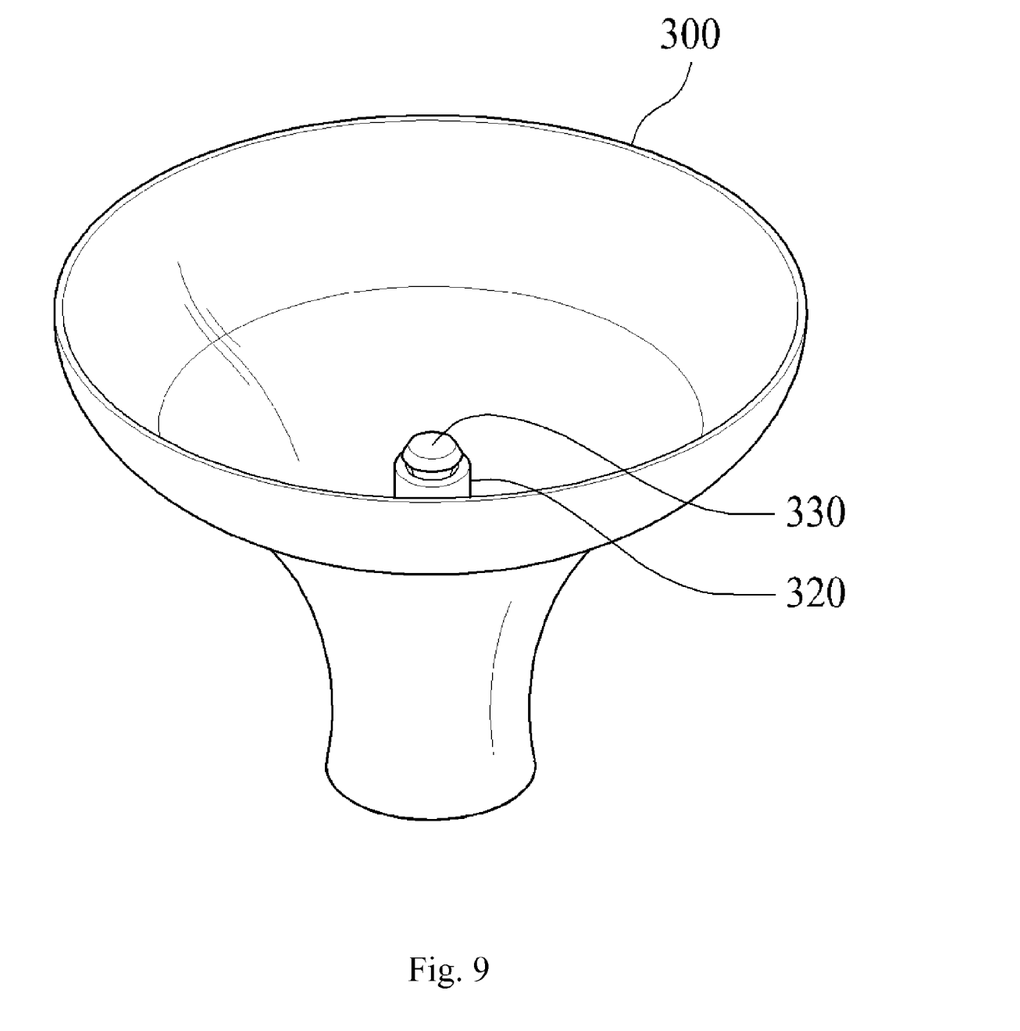
FIG. 9 is a view illustrating a configuration of an ejection block in the assembly type block module for water playing of FIG. 1.
Figure 10:
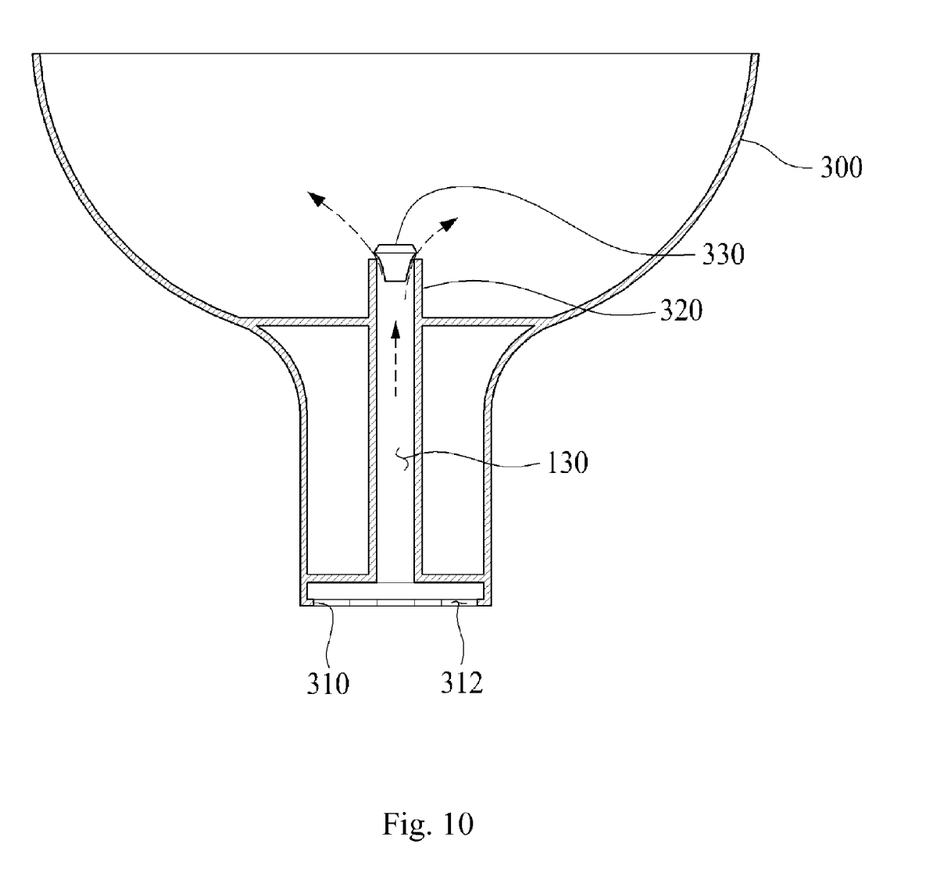
FIG. 10 is a sectional view illustrating an inner configuration of the ejection block of FIG. 9.

Meanwhile, the ejection block 300 according to the present invention is coupled to the unit assembly block 100 such that the fluid flowing through the inner passage 130 may be ejected to the outside through the ejection opening 320, and is coupled to the unit assembly block 100.

In detail, an inner passage 130 is formed in the ejection block 300, and is configured such that fluid may be ejected in various forms by a separate ejection unit 330 provided in the ejection opening 320.

Here, the ejection block 300 is coupled to an end of the ejection block 300 assembled by the user, and in the embodiment of the present invention, as illustrated in FIGS. 9 and 10, a second coupling recess 310 is formed in the ejection block 300 such that the first coupling boss 112 formed in the unit assembly block 100 may be coupled to the second coupling recess 310.

Because the first coupling boss 112 formed in the unit assembly block 100 is inserted into and coupled to the second coupling recess 310 of the ejection block 300, the inner passage 130 formed in the unit assembly block 100 and the inner passage 130 formed in the ejection block 300 may be communicated with each other and may stably maintain a coupling state thereof.

Then, the second coupling recess 310 formed in the ejection block 300 has the same shape as that of the first coupling recess 114 formed in the unit assembly block 100 and thus is stably coupled to the unit assembly block 100, and the inner passages 130 of the second coupling recess 310 and the first coupling recess 114 are communicated with each other such that fluid may flow through the inner passages 130.

In the embodiment of the present invention, a second through-hole 312 is formed in the second coupling recess 310 such that the first coupling boss 112 is inserted into and coupled to the second coupling recess 310.

Accordingly, as the ejection block 300 is coupled to the unit assembly block 100, the fluid supplied from the fluid supply source is ejected to the outside through the ejection unit 330 formed in the ejection block 300 via the plurality of unit assembly blocks 100.

Here, the ejection unit 330 is configured to eject fluid in various forms and may be replaced by the user.

In this way, the assembly type block module for water playing according to the present invention includes the unit assembly blocks 100, the water supply block 200, sand the ejection block 300, and various shapes may be selected and combined by the user.

The assembly type block module for water playing coupled in this way is configured such that the fluid supplied from the fluid supply source flows and is discharged to the outside through the ejection block 300.

Accordingly, a water playing facilities may be realized by the user in a desired form through combination of the unit assembly block 100 and the ejection block 300.

Figure 11:
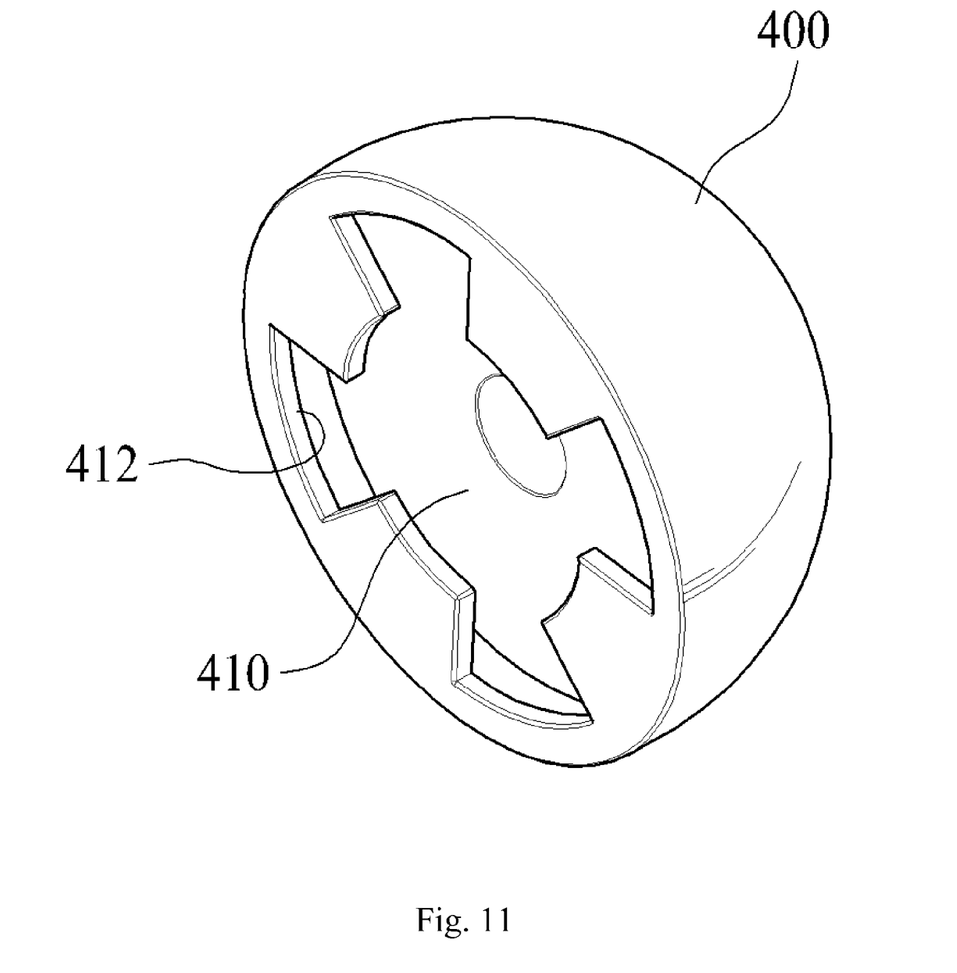
FIG. 11 is a view illustrating a configuration of a blocking block in the assembly type block module for water playing of FIG. 1.
Figure 12:
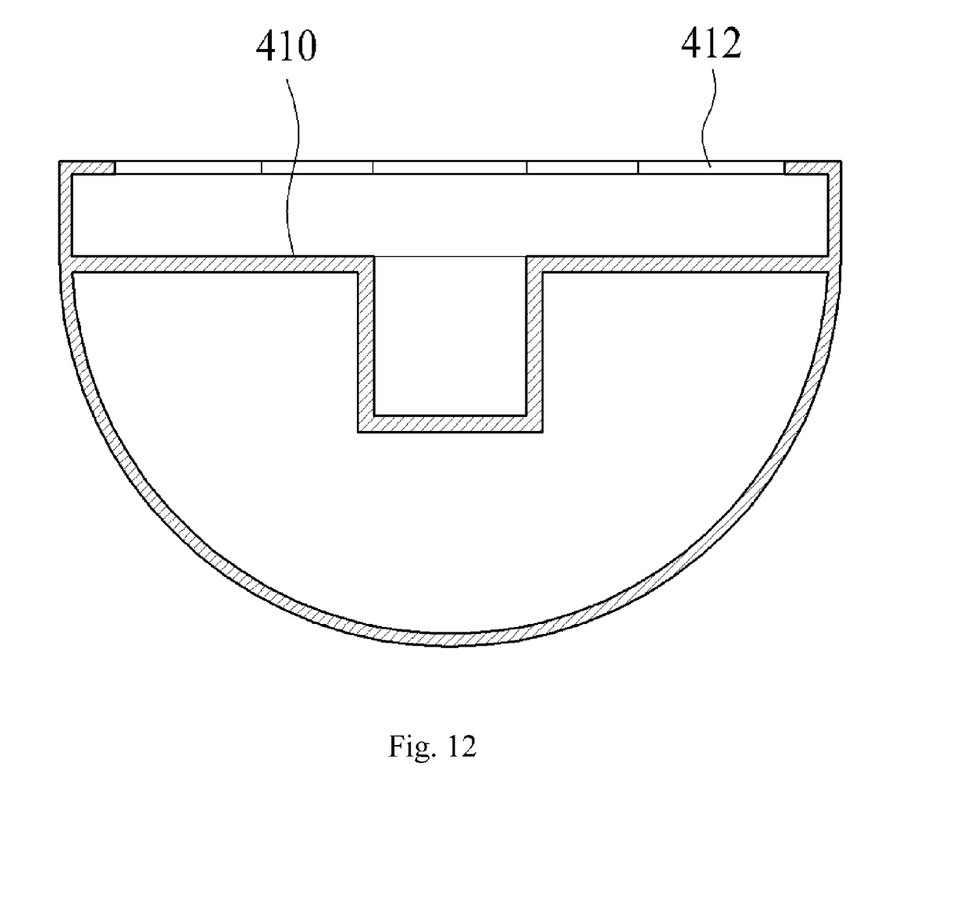
FIG. 12 is a sectional view illustrating an inner configuration of the blocking block of FIG. 11.

Meanwhile, the assembly type block module for water playing according to the present invention may further include a blocking block 400 coupled to any one of the plurality of unit assembly blocks 100 to prevent fluid from being discharged through the outlet 116.

The blocking block 400 is coupled to an end of the unit assembly block 100 to which the plurality of unit assembly blocks 100 are coupled to block the outlet 116, and thus prevents the fluid flowing along the unit assembly blocks 100 from being discharged to the outside.

In detail, a third coupling recess 410 is formed at one side of the blocking block 400 such that the first coupling boss 112 formed in the unit assembly block 100 may be inserted into the third coupling recess 410, and the third coupling recess 410 is formed in the same manner as that of the first coupling recess 114 such that the first coupling boss 112 may be stably coupled to the third coupling recess 410.

In the embodiment of the present invention, a third through-hole 412 through which the first stopping step 112*a* formed in the first coupling boss 112 passes is formed in the third coupling recess 410 to stably couple the blocking block 400 and the unit assembly block 100.

Meanwhile, as illustrated in FIGS. 11 and 12, the blocking block 400 is configured not to have an inner passage 130 therein, and the first coupling boss 112 formed in the unit assembly block 100 is inserted into the blocking block 400 to block the outlet 116.

Here, although not illustrated, a soft blocking member (not illustrated) for preventing leakage of fluid while making contacting with the outlet 116 formed in the unit assembly block 100 may be provided in the third coupling recess 410 formed in the blocking block 400.

In this way, because the assembly type block module for water playing according to the present invention further includes the blocking block 400, the unit assembly blocks 100 may be assembled in various forms and may be assembled in a desired form even if fluid is not ejected.

Furthermore, in the assembly type block module for water playing according to the present invention, the unit assembly blocks 100 may be formed of a transparent material such that the fluid flowing along the inner passages 130 may be visually recognized by the user.

In this case, an aesthetic feeling of the unit assembly block 100 may be increased by providing the fluid supplied from the fluid supply source with a color or providing a separate lamp. Then, the fluid flowing along the unit assembly blocks 100 may be made to flow while not being ejected to the outside, using the blocking block 400, by the user.

Accordingly, the assembly type block module for water playing according to the present invention may be used as various forms of water playing facilities and may be used together with a construction fluid as described above.

Although a specific embodiment of the present invention has been described and illustrated as described above, it will be understood by those skilled in the art to which the present invention pertains that the present invention is not limited to the described embodiment but may be variously changed and modified without departing from the spirit and scope of the present invention. Accordingly, the changes and modifications should not be individually understood from the technical spirit and aspects of the present invention and the modified embodiments fall within the scopes of the claims of the present invention.

What is claimed is:

1. An assembly type block module for water playing, comprising:
  a plurality of unit assembly blocks comprising:
  a body;
  an inner passage formed in the interior of the body such that fluid flows through the inner passage;
  coupling parts detachably coupled to corresponding coupling parts of other unit assembly blocks such that the inner passages thereof are communicated with each other at any one of opposite ends of the body; and
  an election block coupled to at least one of the plurality of unit assembly blocks, for discharging the fluid flowing through the inner passages to the outside in a specific pattern,
  wherein the unit assembly blocks have different shapes of the bodies and different forms of inner passages, fluid is supplied from an external fluid supply source while the unit assembly blocks are assembled, and the supplied fluid is discharged to the outside through the inner passage of the unit assembly block located at the extreme end after flowing through the inner passages of the unit assembly blocks.

2. The assembly type block module for water playing of claim 1, further comprising:
  a water supply block provided on an installation surface and coupled to the unit assembly block, for delivering the fluid supplied from the fluid supply source to the inner passage formed in the unit assembly block.

3. The assembly type block module for water playing of claim 1, further comprising:
  at least one blocking block coupled to the unit assembly block, for blocking the fluid such that the fluid is not discharged to the outside through the inner passages.

4. The assembly type block module for water playing of claim 1, wherein at least a portion of the unit assembly block is formed of a transparent material.

5. The assembly type block module for water playing of claim 1, wherein some of the plurality of unit assembly blocks have different shapes.

6. The assembly type block module for water playing of claim 1, wherein some of the unit assembly blocks are curved and the inner passages thereof are curved correspondingly.

7. An assembly type block module for water playing, comprising:
  a plurality of unit assembly blocks comprising:
  a body;
  an inner passage formed in the interior of the body such that fluid flows through the inner passage; and
  coupling parts detachably coupled to corresponding coupling parts of other unit assembly blocks such that the inner passages thereof are communicated with each other at any one of opposite ends of the body,
  wherein the unit assembly blocks have different shaves of the bodies and different forms of inner passages, fluid is supplied from an external fluid supply source while the unit assembly blocks are assembled, the supplied fluid is discharged to the outside through the inner passage of the unit assembly block located at the extreme end after flowing through the inner passages of the unit assembly blocks, the coupling part has an inlet through which the fluid is introduced at one side of the body and an outlet through which the fluid is discharged at another side of the body along a lengthwise direction of the inner passage, and the plurality of unit assembly blocks are configured such that the outlets and the inlets formed therein make contact with each other and the inner passages thereof are communicated with each other when the unit assembly blocks are coupled to each other.

8. The assembly type block module for water playing of claim 7, wherein the coupling part comprises:
   a first coupling boss protruding from a side distance from the outlet by a predetermined length; and
   a first coupling recess recessed such that the first coupling boss having the inlet is inserted into the first coupling recess.

9. The assembly type block module for water playing of claim 8, wherein the first coupling boss has at least one first stopping step protruding in a direction crossing the protrusion direction of the first coupling boss at a lengthwise end thereof, a first through-hole recessed such that the first stopping step passes through the first through-hole is formed in correspondence to the first coupling boss along a circumference of the first coupling recess, and it is selectively determined by the mutual rotation angle of the plurality of unit assembly blocks whether the plurality of unit assembly blocks are coupled to each other.

10. The assembly type block module for water playing of claim 7, wherein the unit assembly block is formed such that at least some of the plurality of inner passages are branched to have a plurality of outlets.

11. An assembly type block module for water playing, comprising:
   a plurality of unit assembly blocks comprising:
   a body;
   an inner passage formed in the interior of the body such that fluid flows through the inner passage;
   coupling parts detachably coupled to corresponding coupling parts of other unit assembly blocks such that the inner passages thereof are communicated with each other at any one of opposite ends of the body; and
   a separate sealing member provided on the coupling part, for preventing the fluid from being leaked to the outside through the inner passages formed in the plurality of unit assembly blocks when the unit assembly blocks are coupled to each other,
   wherein the unit assembly blocks have different shapes of the bodies and different forms of inner passages, fluid is supplied from an external fluid supply source while the unit assembly blocks are assembled, and the supplied fluid is discharged to the outside through the inner passage of the unit assembly block located at the extreme end after flowing through the inner passages of the unit assembly blocks.

12. An assembly type block module for water playing, comprising:
   a plurality of unit assembly blocks comprising:
   a body;
   an inner passage formed in the interior of the body such that fluid flows through the inner passage; and
   coupling parts detachably coupled to corresponding coupling parts of other unit assembly blocks such that the inner passages thereof are communicated with each other at any one of opposite ends of the body,
   wherein the unit assembly blocks have different shapes of the bodies and different forms of inner passages, fluid is supplied from an external fluid supply source while the unit assembly blocks are assembled, the supplied fluid is discharged to the outside through the inner passage of the unit assembly block located at the extreme end after flowing through the inner passages of the unit assembly blocks, the unit assembly block is formed of a soft material, and the shape of the unit assembly block is selectively deformed by the user.

\* \* \* \* \*